(12) United States Patent
Stutz et al.

(10) Patent No.: US 10,759,126 B2
(45) Date of Patent: Sep. 1, 2020

(54) CARRIER FOR CARRYING AN OPHTHALMIC LENS DURING ITS TREATMENT IN A BATH

(71) Applicant: Novartis AG, Basel (CH)

(72) Inventors: Michael Stutz, Kleinwallstadt (DE); Thomas Leibold, Seligenstadt (DE); Jennifer Schmitt, Rodgau (DE); Roger Biel, Aschaffenburg (DE); Matthias Braun, Kleinwallstadt (DE); Katrin Sylke Struckmeier, Aschaffenburg (DE); Michael Frederick Waldern, Zurich (CH); Daniel Wilhelm, Zurich (CH)

(73) Assignee: Alcon Inc., Fribourg (CH)

( * ) Notice: Subject to any disclaimer, the term of this patent is extended or adjusted under 35 U.S.C. 154(b) by 226 days.

(21) Appl. No.: 15/940,245

(22) Filed: Mar. 29, 2018

(65) Prior Publication Data

US 2018/0281321 A1 Oct. 4, 2018

Related U.S. Application Data

(60) Provisional application No. 62/480,677, filed on Apr. 3, 2017.

(51) Int. Cl.
| | |
|---|---|
| B23Q 3/00 | (2006.01) |
| B29C 71/00 | (2006.01) |
| B08B 3/04 | (2006.01) |
| B29D 11/00 | (2006.01) |
| B29L 11/00 | (2006.01) |

(52) U.S. Cl.
CPC ............ *B29C 71/0009* (2013.01); *B08B 3/04* (2013.01); *B29D 11/0023* (2013.01); *B29C 2071/0027* (2013.01); *B29D 11/0025* (2013.01); *B29L 2011/0016* (2013.01)

(58) Field of Classification Search
USPC ..................... 269/289 R, 296, 302; 206/5.1
See application file for complete search history.

(56) References Cited

U.S. PATENT DOCUMENTS

| | | | |
|---|---|---|---|
| 5,080,839 A | 1/1992 | Kindt-Larsen | |
| 6,071,112 A | 6/2000 | Calvin | |
| 6,183,236 B1 | 2/2001 | Lesczynski | |
| 6,347,870 B1 * | 2/2002 | LaRuffa ........... | B29D 11/00067 134/25.5 |
| 6,581,761 B1 | 6/2003 | Stafford et al. | |
| 6,695,988 B1 | 2/2004 | Schlagel et al. | |

(Continued)

*Primary Examiner* — Joseph J Hail
*Assistant Examiner* — Shantese L McDonald
(74) *Attorney, Agent, or Firm* — Sheng-Hsin Hu

(57) ABSTRACT

A carrier for carrying an ophthalmic lens comprises:
a basket (10) comprising a basket wall defining a concave cavity for accommodating an ophthalmic lens (100), the basket further comprising at least three recesses (12) arranged in the basket wall at different locations along the circumference of the basket (10); and
a retainer (20) comprising at least three retainer arms (21) arranged in a star-shaped configuration corresponding to the arrangement of the recesses (12) along the circumference of the basket (10).
In an assembled state each retainer arm (21) of the retainer (20) engages with a corresponding one of the recesses (12) in the basket wall of the basket (10) to retain the ophthalmic lens (100) in the cavity.

12 Claims, 6 Drawing Sheets

(56) References Cited

U.S. PATENT DOCUMENTS

| | | |
|---|---|---|
| 7,163,583 B2 | 1/2007 | Gilliard |
| 7,811,503 B2 | 10/2010 | Daulton |
| 7,897,071 B2 | 3/2011 | Goodenough |
| 7,968,018 B2 | 6/2011 | Daulton |
| 8,293,026 B1 | 10/2012 | Bodor |
| 8,596,782 B2 | 12/2013 | Matsuzawa |
| 9,102,110 B2 | 8/2015 | Bruce |
| 9,801,445 B2 * | 10/2017 | Beil ................. B05C 13/00 |
| 2003/0024829 A1 * | 2/2003 | Matsuzawa ............ A61L 2/18 |
| | | 206/5.1 |
| 2005/0258096 A1 | 10/2005 | Stafford |
| 2007/0138669 A1 | 6/2007 | Lai |
| 2008/0257389 A1 | 10/2008 | Daulton |
| 2009/0190090 A1 | 7/2009 | Hung |
| 2012/0138488 A1 * | 6/2012 | English ............ B29D 11/0025 |
| | | 206/5.1 |
| 2013/0220855 A1 | 8/2013 | Markovitch |
| 2014/0174956 A1 | 6/2014 | Biel |
| 2017/0086553 A1 | 3/2017 | Beil |

\* cited by examiner

CARRIER FOR CARRYING AN OPHTHALMIC LENS DURING ITS TREATMENT IN A BATH

This application claims the benefit under 35 USC § 119 (e) of U.S. provisional application No. 62/480,677 filed 3 Apr. 2017, incorporated by reference in its entirety.

FIELD OF THE INVENTION

The present invention relates to a carrier for carrying an ophthalmic lens during its treatment in a bath. The invention, in other aspects, also relates to a carrier array for forming a plurality of such carriers, to a carrier tray comprising a frame and one or more carrier arrays attached to the frame, and to a carrier stack system comprising a plurality of such carrier trays arranged one above the other to form a stack.

BACKGROUND OF THE INVENTION

Mass production of ophthalmic lenses, in particular contact lenses such as soft contact lenses, generally includes one or more bath treatments in which the lenses are treated with water or specific treatment liquids in order to modify the properties of the lenses. For example, in the manufacture of silicone hydrogel soft contact lenses a lens-forming material is dispensed into a mold for single use or into a reusable mold and is subsequently cured to form the contact lens. After curing any undesirable substances, for example solvents, contained in the cured contact lens need to be extracted before the contact lens can be worn. In addition, it may be necessary or desirable to apply a coating to the extracted contact lens in order to increase the contact lens' hydrophilic properties. Both, the extraction process as well as the coating process, are typically performed by successively transporting the cured contact lenses through one or more baths.

In this regard, it is known to transport the contact lenses through the baths in the interior of contact lens carriers having the shape of a more or less cylindrical tube having a bottom. The tube and the bottom may comprise openings or slots through which the treatment liquid may enter and exit the interior of the tube to allow the contact lens contained in the interior of the tube to be sufficiently exposed to the treatment liquid. The contact lens is retained in the interior of such tube by means of a circular diaphragm having inwardly extending flexible fins, so that once the contact lens has been inserted into the interior of the tube in the space between the diaphragm and the bottom of the tube, the lens cannot escape from that space until it is removed again from this space, for example with the aid of a suitable gripper. A plurality of such tubes may be arranged side by side and may be transported through the baths. This is an efficient way of treating the lenses in baths, however, only if the duration of exposure of the lens to the treatment liquid or liquids is within certain time limits. In particular, for rather long exposure times as this is the case, for example, in the extraction of customized silicone hydrogel lenses in aqueous treatment baths, the efficiency of the treatment process is open to improvement.

Hence, for reasons of efficiency and cost-effectiveness there is a continuing need for contact lens carriers allowing high numbers of contact lenses to be simultaneously exposed to the treatment liquid. On the other hand, it is crucial that the contact lenses are sufficiently exposed to the treatment liquid as the treatment of the contact lenses, for example the extraction or the coating of the contact lenses, must be as effective and complete as possible. At the same time, it is necessary to ensure that the contact lenses cannot escape from their carrier during the bath treatment.

SUMMARY OF THE INVENTION

These and other objects are met by a carrier as it is specified by the features of the independent claim directed to such carrier. Advantageous embodiments of the carrier according to the invention are the subject of the dependent claims.

According to one aspect of the invention, a carrier is suggested for carrying an ophthalmic lens, in particular a contact lens such as a soft contact lens, during its treatment in a bath. The carrier comprises:
a basket comprising a basket wall defining a concave cavity for accommodating an ophthalmic lens, the basket further comprising at least three recesses arranged in the basket wall at different locations along the circumference of the basket; and
a retainer comprising at least three retainer arms arranged in a star-shaped configuration corresponding to the arrangement of the recesses along the circumference of the basket.

In an assembled state each retainer arm of the retainer engages with a corresponding one of the recesses in the basket wall of the basket to retain the ophthalmic lens in the cavity.

According to one aspect of the carrier according to the invention, the recesses are continuous recesses extending through the basket wall.

According to a further aspect of the carrier according to the invention, the retainer arms extend radially outwards through the continuous recesses in the basket wall.

In accordance with still a further aspect of the carrier according to the invention, the recesses are arranged to extend downwards from an upper rim of the basket wall.

In accordance with yet a further aspect of the carrier according to the invention, the basket wall comprises at least three circumferentially arranged basket wall segments defining the concave cavity.

According to a further aspect of the carrier according to the invention, between adjacently arranged basket wall segments of the at least three circumferentially arranged basket wall segments one of the said recesses is arranged, respectively.

According to still a further aspect of the carrier according to the invention, each basket wall segment of the at least three basket wall segments comprises a U-shaped or C-shaped frame.

In accordance with another aspect of the carrier according to the invention, an open area percentage of the basket wall is at least 30%.

In accordance with a further aspect of the carrier according to the invention, each of the retainer arms comprises a fin or a blade or a bar.

According to another aspect of the carrier according to the invention, the retainer arms radially merge in a common central hub of the retainer arms.

According to still a further aspect of the carrier according to the invention, the basket wall and each of the retainer arms comprise a lens-contacting surface. The lens-contacting surface of the basket wall is larger than the sum of the lens-contacting surfaces of all retainer arms.

According to yet a further aspect of the carrier according to the invention, the lens-contacting surface of the respective retainer arm is convex.

Another aspect of the invention relates to a carrier array for forming a plurality of carriers as described above. The carrier array comprises a plurality of baskets and a plurality of retainers
each basket comprising a basket wall defining a concave cavity for accommodating an ophthalmic lens, the basket further comprising at least three recesses arranged in the basket wall at different locations along the circumference of the basket; and
each retainer comprising at least three retainer arms arranged in a star-shaped configuration corresponding to the arrangement of the recesses along the circumference of the basket.

A said retainer is integrally formed with each basket and is arranged on a side of the basket opposite to the basket wall defining the concave cavity, and the baskets and retainers of the carrier array are arranged in one or more rows or in a matrix configuration comprising rows and columns.

Still a further aspect of the invention relates to a carrier tray comprising a frame and one or more carrier arrays as described above, the carrier arrays being attached to the frame.

Yet a further aspect of the invention relates to a carrier stack system comprising a plurality of carrier trays as described above which are arranged one above the other to form a stack. With respect to two carrier trays adjacently arranged in the stack the retainer arms of the retainer of an upper carrier tray of the two adjacently arranged carrier trays engage with the recesses in the basket wall of the basket of the lower carrier tray of the two adjacently arranged carrier trays.

The carrier according to the present invention—comprising a basket for accommodating a contact lens and a corresponding retainer for retaining the ophthalmic lens in the basket—advantageously allows for both, secure and captive carriage of the lens during its treatment in a bath as well as high exposure of the lens to the surrounding treatment liquid. In the following, by way of example contact lenses are further discussed as representing one particular type of ophthalmic lenses, without the invention being restricted to the treatment of contact lenses. As used herein the term "basket" denotes any kind of open receptacle having a cavity formed by a basket wall at least a portion of which is permeable to fluids. That is to say, the basket comprises a basket wall having one or more passageways or open areas or perforations such as to allow both, liquid and gaseous substances, to pass through. As a consequence, treatment liquid may freely flow into and out of the cavity which advantageously provides for a continuous flow of treatment liquid over the contact lens accommodated in the cavity formed by the basket wall. In addition, the permeability of the basket to fluids including gaseous substances ensures that air bubbles do not adhere to the contact lens but can freely escape from the cavity during the bath treatment. This also proves advantageous with regard to a high exposure of the contact lens to the surrounding treatment liquid. The form and size of a single passageway or open area or perforation is such as to prevent a contact lens to slip therethrough and thus to escape from the carrier.

In order to allow as much treatment liquid as possible to flow into and out of the cavity, the open area percentage of the basket wall may be at least 30%, in particular at least 50%, preferably at least 70%, more preferably at least 80%. In addition, a high open area percentage advantageously provides significant material and weight savings. As used herein, the "open area percentage" is defined as the ratio between the total open area and the total (open and non-open) area of the basket wall that defines the cavity of the basket. In other words, the open area percentage is a ratio expressed in percent which reflects how much of the total area of the basket wall is formed by passageways or open areas or perforations.

The basket may comprise a plurality of basket segments of a frame-like configuration to minimize flow restrictions for the treatment liquid. The frame-like basket segments define the cavity and may support a contact lens accommodated in the basket. Preferably, the basket may comprise one or more U-shaped or C-shaped frame elements. A frame-like configuration of the basket segments also proves advantageous with regard to material and weight savings.

As mentioned already, the basket is an open receptacle and the basket wall defines an open cavity having a receiving opening defined by an upper rim of the basket wall. A contact lens to be accommodated in the cavity may be inserted into the cavity via the receiving opening. The cavity defined by the basket wall is concave and at least a portion of the cavity, in particular a bottom portion of the cavity, has a radius of curvature which to some extent corresponds to the radius of curvature of the convex anterior surface of the contact lens to be accommodated in the cavity. Once the contact lens has been inserted into the cavity, the retainer is likewise brought into engagement with the basket via the receiving office.

The retainer comprises at least three retainer arms arranged in a star-shaped configuration. The star-shaped configuration of the retainer arms corresponds to the arrangement of the recesses in the basket wall along the circumference of the basket such that in an assembled state each retainer arm engages with a corresponding one of the recesses in the basket wall. Both, the star-shaped configuration as well as the arm-like structure facilitate a continuous flow of treatment liquid over the contact lens accommodated in the cavity and retained by the retainer.

Preferably, the at least three recesses in the basket wall are equidistantly arranged along the circumference of the basket. Likewise, the at least three retainer arms of the retainer are arranged in a corresponding star-shaped configuration so as to be able to engage with the respective recesses in the basket wall.

The number of at least three retainer arms provides at least a three-point support which advantageously ensures secure retaining of a contact lens in the cavity formed by the basket wall, and in particular it eliminates or at least greatly reduces the risk for an undesired folding of a contact lens in the basket which may otherwise result in the folded lens being capable of escaping from the carrier even in the assembled state.

In one embodiment, the basket wall of the carrier may comprise four recesses and the retainer may comprise four retainer arms. In this case, the star-shaped configuration is cross-shaped. Four retainer arms may prove particularly advantageous in arranging a plurality of such carriers in a matrix configuration in a carrier tray. The number of recesses in the basket wall is at least equal to the number of retainer arms of the retainer. However, the basket wall may also have a larger number of recesses, in particular an integer multiple of the number of retainer arms of the retainer. This may allow the retainer arms to engage with the recesses in different assembled states.

The recesses may serve as guiding means for the retainer arms when the retainer is brought into engagement with the basket. Furthermore, they may provide for a rotational lock. The recesses may further serve as bearing seat for holding the retainer in the assembled state in a predetermined position relative to the basket.

Due to the engagement of the retainer arms with the recesses arranged in the basket wall, in the assembled state of the carrier the cavity is securely closed in the vicinity of the recesses. When being engaged with the recesses in the basket wall, each of the retainer arms forms a barrier preventing a contact lens in the cavity from slipping along the inner surface of the basket wall towards the rim of the basket, thus preventing a contact lens from escaping from the cavity.

Each of the recesses opens up at least towards the cavity defined by the basket wall (but may extend through the basket wall to form slots). Thus, the recesses allow each retainer arm to engage with its corresponding recesses when the retainer is brought into engagement with the basket via a receiving opening defined by the rim of the basket wall.

Engagement of a retainer arm with a recess does not necessarily imply a direct physical contact between the retainer arms and the basket wall at the recess. Rather, the retainer and the basket may not be in direct physical contact. Instead, once engaged there may remain a gap between the retainer arm and the basket wall. This may facilitate assembly of the retainer and the basket, in particular when a plurality of retainers of a tray is simultaneously assembled with a plurality of baskets of another tray.

The recesses (for example slots extending through the basket wall) may be arranged to extend downwards from an upper rim of the basket wall, for example at different locations along the rim of the basket wall. In particular, the recesses may extend from the basket rim into basket wall towards a bottom portion of the basket. The basket may comprise at least three, for example four, basket segments which are circumferentially arranged to define the concave cavity, and between each of the adjacently arranged basket segments a recess (e.g. a slot) is arranged. This is a simple basket design which is robust and inexpensive to manufacture.

The retainer arms may extend radially outwards through the continuous recesses in the basket wall so as to provide a barrier at the inner surface of the basket wall which prevents a contact lens from slipping along the basket wall and escaping from the cavity. In case the recesses are continuous recesses, the retainer arms may even extend radially outwards beyond an outer circumference of the basket wall at the level where the retainer arms engage with the recesses.

The retainer arms may be of any shape and size. For example, each of the retainer arms may comprise or be embodied as a fin, a blade, bar or a rod. For example, the retainer may comprise fins or blades which are arranged upright in a star-shaped configuration. Fin-like or blade-like retainer arms advantageously increase the stiffness of the retainer and may also prove advantageous for simultaneously assembling a plurality of retainers arranged in a matrix configuration on a tray (rows and columns) with a plurality of basket arranged in a corresponding matrix configuration on another tray.

The retainer arms, for example the afore-mentioned fins or blades, may radially merge in a common central hub which further increases the stiffness and stability of the retainer.

In the assembled state, the retainer arms and the basket wall are arranged in a predetermined predefined fixed position relative to each other to define a space within the concave cavity defined by the basket wall in which the contact lens is securely held. The dimensions of that space are such that the contact lens may still move a little bit within the said space allowing good contact and exposure of the contact lens to the liquid, however, movement of the contact lens within the said space is limited only as folding of the contact lens in the said space is to be avoided. The basket wall may comprise a (concave) lens-contacting surface, and each of the retainer arms may comprise a (convex, for example chamfered) lens-contacting surface, and the lens contacting surface of the basket wall is larger than the sum of the lens-contacting surfaces of the retainer arms, so that upon removing the retainer from the basket after the lens treatment the contact lens remains in the basket wall rather than being removed together with the retainer, to allow for an automated removal of the lens from the basket (for example with the aid of a gripper).

A carrier array according to the invention may comprise a plurality of baskets as described above and a plurality of retainers as described above, with a said retainer being integrally formed on a side of the basket opposite to the basket wall defining the cavity. The baskets and retainers of the array are arranged in one or more rows or in a matrix configuration comprising rows and columns. For example, the baskets may be arranged on an upper side of the carrier array while the retainers are integrally formed with the basket on the lower side of the carrier array. When two such carrier arrays are assembled one above the other, a plurality of individual carriers is formed each being capable of carrying a contact lens to be treated. By way of example, a carrier array may comprise twenty baskets and carriers arranged in a 4×5 matrix configuration.

With regard to efficiently processing a very high number of contact lenses simultaneously, such carrier arrays can advantageously be used in carrier trays with each carrier tray comprising preferably a plurality of carriers arrays attached to a frame of the carrier tray in the same arrangement. For example, the carrier arrays can be releasably attached to the frame so that they can be easily mounted or removed from the frame (for example if they need to be replaced). Upon assembling two or more such carrier trays one above the other to form a carrier stack system, the retainer arms of the retainers of the respective carrier arrays of the upper carrier tray of two adjacently arranged carrier trays engage with the corresponding recesses in the basket walls of the baskets of the respective carrier arrays of the lower carrier tray of the two adjacently arranged carrier trays. Again by way of example, one carrier tray may comprise eight carrier arrays as described above which are attached to the frame of the carrier tray in a 2×4 matrix configuration. Such carrier stack system further increases the efficiency since the number of contact lenses that can be simultaneously treated is further increased which is particularly advantageous in case the treatment process takes considerable time.

In preparation for a bath treatment, a first carrier tray may be provided and contact lenses may be inserted into the baskets of the first carrier tray. In a next step, a second carrier tray may be stacked on top of the first carrier tray such that the retainers at the lower side of the second carrier tray engage with recesses of the baskets on the upper side of the first carrier tray. Thus, the all baskets of the first carrier tray containing the contact lenses are simultaneously assembled with retainers of the second carrier tray in a single step. At the same time, this step advantageously provides the next array of baskets (the baskets arranged on the upper side of the second carrier tray) into which contact lenses can be inserted.

The individual carriers, the carrier array, the carrier tray and carrier stack system nits are preferably made from a plastic material. In particular, they are injection-molded as injection-molding allows for a simple, robust and inexpensive manufacture.

As used in the specification including the appended claims, the singular forms "a", "an", and "the" include the plural, unless the context explicitly dictates otherwise. When using the term "about" with reference to a particular numerical value or a range of values, this is to be understood in the sense that the particular numerical value referred to in connection with the "about" is included and explicitly disclosed, unless the context clearly dictates otherwise. For example, if a range of "about" numerical value a to "about" numerical value b is disclosed, this is to be understood to include and explicitly disclose a range of numerical value a to numerical value b. Also, whenever features are combined with the term "or", the term "or" is to be understood to also include "and" unless it is evident from the specification that the term "or" must be understood as being exclusive.

BRIEF DESCRIPTION OF THE DRAWINGS

Further advantageous aspects of the invention become apparent from the following description of embodiments of the invention with the aid of the drawings, in which:

FIG. 1 shows a perspective view of a carrier array 40 comprising plurality of carrier elements 1 which is shown enlarged in the circle at the lower end of FIG. 1. Each carrier element 1 forms a part of an individual carrier for carrying a contact lens during a bath treatment. Accordingly, a single individual carrier comprises on the one hand a basket 10 the basket wall of which forms a concave cavity for accommodating a contact lens, and on the other hand a corresponding retainer 20 which is configured to engage with the basket 10 for retaining the contact lens in the cavity. Accordingly, in the embodiment shown a single individual carrier for carrying a contact lens is formed by the basket 10 of a carrier element 1 of a carrier array 40 and a retainer 20 of a further carrier array 40 (not shown in FIG. 1, see further below) arranged above the carrier array 40 shown in FIG. 1.

Figure 1:
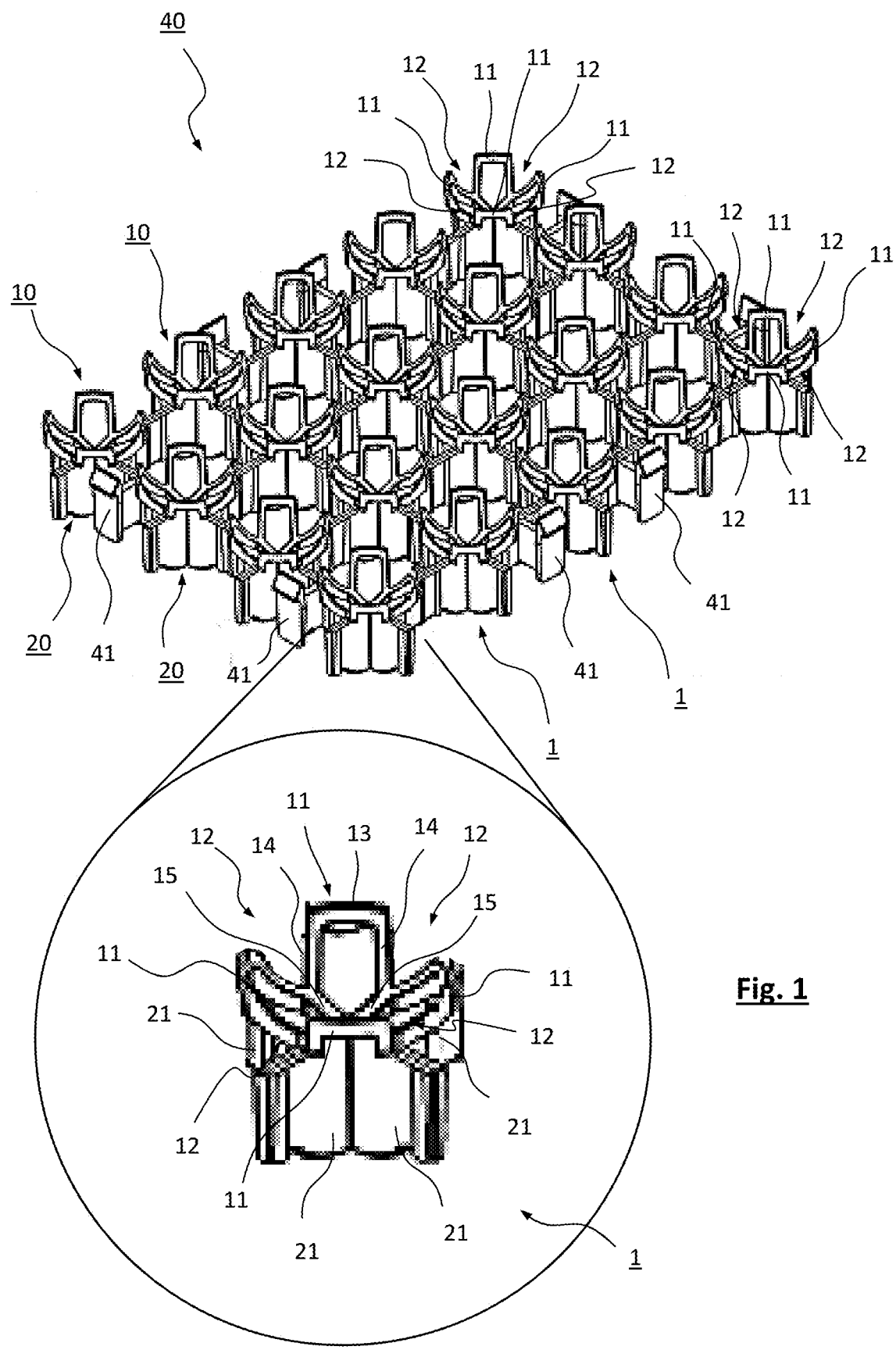
FIG. 1 shows a perspective view from above of a 4×5 matrix configuration of a carrier array according to one embodiment of the invention.

Accordingly, in the embodiment shown the carrier element 1 may be considered as a constructional base unit having a dual function as being involved in the formation of two adjacent individual carriers. The basket 10 of the carrier element 1 shown in FIG. 1 serves to accommodate a contact lens (to be retained by a retainer 20 of a further carrier element 1 arranged above the said basket 10) while the retainer 20 of the carrier element 1 shown in FIG. 1 serves to retain a contact lens (accommodated in the basket 10 of a carrier element 1 arranged below the said retainer 20). In other words, in the embodiment shown an individual carrier comprises the basket 10 a first carrier element 1 and the retainer 20 of a second carrier element 1 arranged above the first carrier element 1, as can be seen in FIG. 2.

In the embodiment shown, each the basket wall of each basket 10 comprises four basket wall segments 11 which are circumferentially arranged to form a concave cavity. As can be seen from FIG. 1, the basket 10 may have a calyx-like configuration and shape, with each of the four basket wall segments 11 forming a calyx petal. Alternatively, each basket 10 may be considered to be of a crown-like configuration and shape. Each basket wall segment 11 comprises a U-shaped frame comprising a transverse bar 13 and two side bars 14. The side bars 14 of two adjacently arranged basket wall segments 11 merge in a V-shaped configuration into a common base element 15 of the two adjacently arranged basket wall segments. The four base elements 15 of each basket 10 in turn merge radially inwards in a hub arranged at the lowest point of the basket 10. Each basket 10 has an upper basket rim defining a receiving opening for inserting a contact lens into the cavity formed by the basket wall of basket 10. The transverse bars 13 of the four basket segments 11 are circumferentially arranged along the basket rim.

Each basket 10 comprises four recesses 12 which are circumferentially arranged along the basket rim. Each recess 12 extends downwardly from the basket rim and between two adjacently arranged basket wall segments 11. More precisely, each recess 12 is arranged between the side bars 14 of two adjacently arranged basket wall segments 11. Due to the side bars 14 converging in a V-shape, the recesses 12 are V-shaped, too. The recesses 12 are continuous recesses extending through the basket wall. In addition, each recess 12 is open towards the basket rim. Each basket 10 is rotationally symmetric with regard to a central axis of the basket normal to a plane defined by the basket rim. In particular, each basket 10 is rotationally symmetric with regard to a rotation by 90° around this central axis. Accordingly, the four recesses are evenly distributed or equidistantly arranged along the circumference of the basket 10.

The frame-like structure of the baskets 10 provides for a plurality of open areas in the basket wall which allow for a continuous flow of treatment liquid into and out of the cavity and over the contact lens which is arranged in the said cavity. In addition to the open V-shaped recesses 12, the basket 10 comprises four open areas of pentagonal shape which are enclosed by the transverse bar 13 and the two side bars 14 of each of the basket wall segments 11 as well as by the base elements 15 of the respective adjacently arranged basket wall segments 11. In the present embodiment, the total open area of the basket wall is in the range of 70% to 80% of the total (open and non-open) area of the basket wall.

On the side opposite to the basket 10, that is adjacent to the hub at the lowest point of the basket 10 into which the common base elements 15 merge, each carrier element 1 comprises a retainer 20 for engagement with a basket 10 of another carrier element that is arranged below the carrier element 1 shown. Each retainer 20 comprises four retainer arms 21 arranged in a star-shaped configuration according to the arrangement of the recesses 12 along the basket rim. As illustrated in FIG. 2, each of the retainer arms 21 engages with a corresponding one of the recesses 12 of the carrier element 1 arranged below in order to form a carrier. Each retainer arm 21 comprises a fin extending radially outwards through the respective recess 12 and beyond the outer circumference of the basket wall, at least at the level where the fins engage with the corresponding recesses 12. The four fins or retainer arms 21 merge into a common central hub 22. Thus, each retainer arm 21 provides a barrier at the inner surface of the basket wall to prevent a contact lens from slipping along the basket wall and escaping out of the cavity. The fin-like shape of the retainer arms 21 is also advantageous with regard to the stiffness and stability of the retainer 20.

Figure 2:
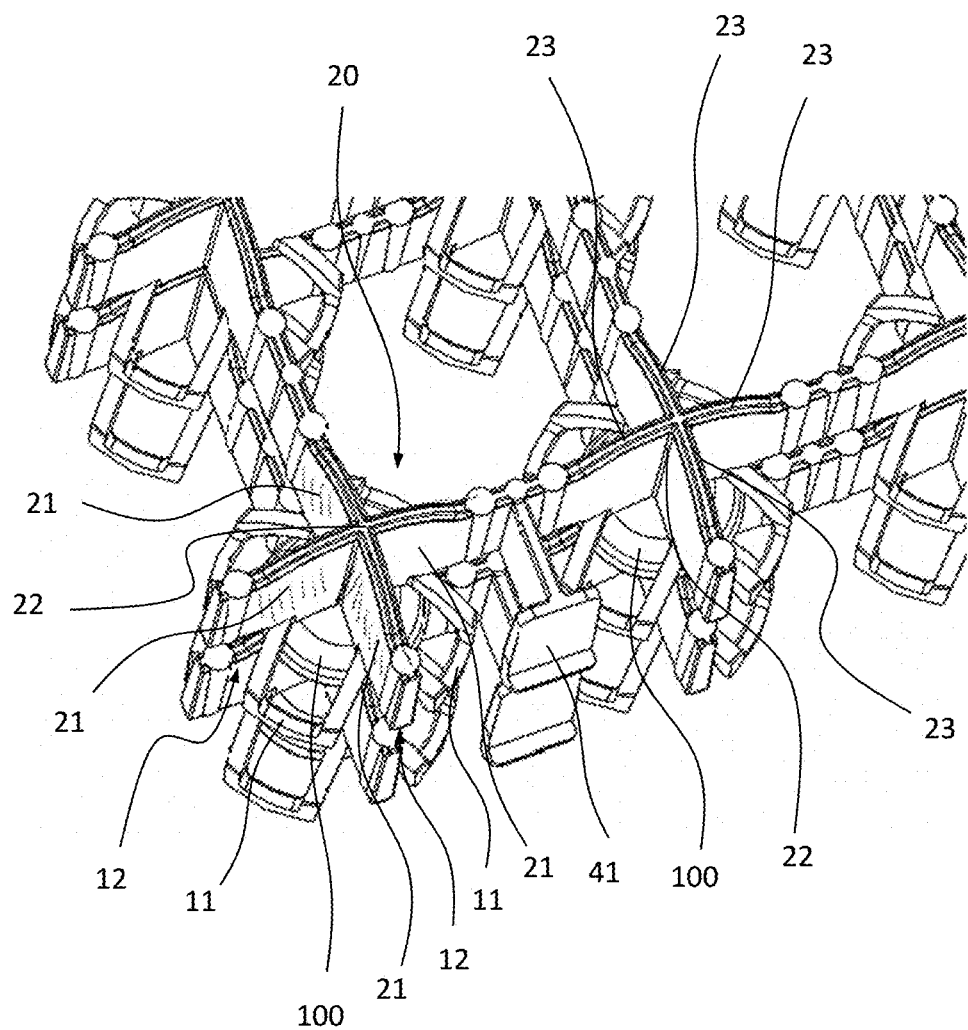
FIG. 2 shows a perspective view from below of a detail of two carrier arrays as shown in FIG. 1 arranged one above the other.

As can be seen from FIGS. 1 and 2, the basket 10 and the retainer 20 of each carrier element 1 are integrally formed with each other. In particular, each of the four base elements 15 of the basket 10 merges into or is integrally formed with an upper portion of the corresponding retainer arm 21 of the retainer 20.

In the assembled state, the retainer arms 21 and the basket 10 are arranged in predetermined position relative to each other, thereby defining a space within the cavity in which a contact lens may be securely held. The dimensions of that space are such that the contact lens may still move a little bit within the said space, however, as can be seen from FIGS. 2, 4 and 6, the contact lens 100 is basically trapped in that space in the lower portion of the cavity.

With regard to an automated removal of contact lenses from the carrier, it is advantageous that the contact lenses always remain with the same part of the carrier, i.e. either only remain in the basket 10 or remain with the retainer 20. In the embodiment shown, the basket 10 and the retainer 20 are configured such that the lens-contacting surface of the basket wall is larger than the sum of the convex, chamfered lens-contacting surfaces 23 of the retainer arms 21 in order to ensure that the contact lenses always remain in the baskets 10. The convex, chamfered lens-contacting surfaces 23 of the retainer arms 21 correspond to those portions of their lower edge which are facing the cavity or the space where the lens is contained in the assembled state. Likewise, the lens-contacting surface of the basket wall corresponds to those portions of the base elements 15 and the side bars 14 which may come into contact with the contact lens in the assembled state of the carrier.

Figure 3:
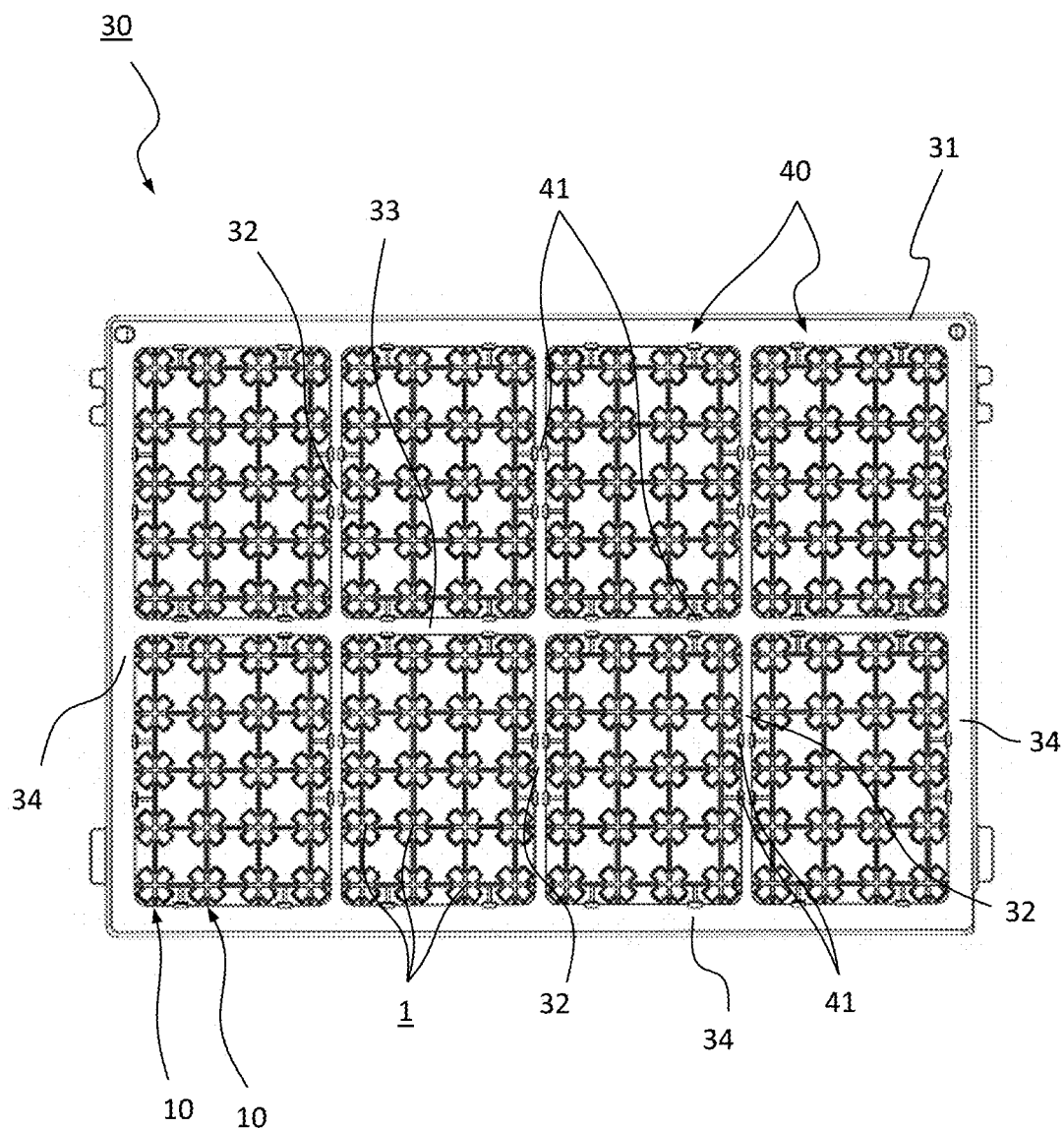
FIG. 3 shows a top view of an embodiment of a carrier tray according to the invention, comprising eight 4×5 carrier arrays as shown in FIG. 1 which are attached to a frame of the carrier tray in a 2×4 matrix configuration.
Figure 4:
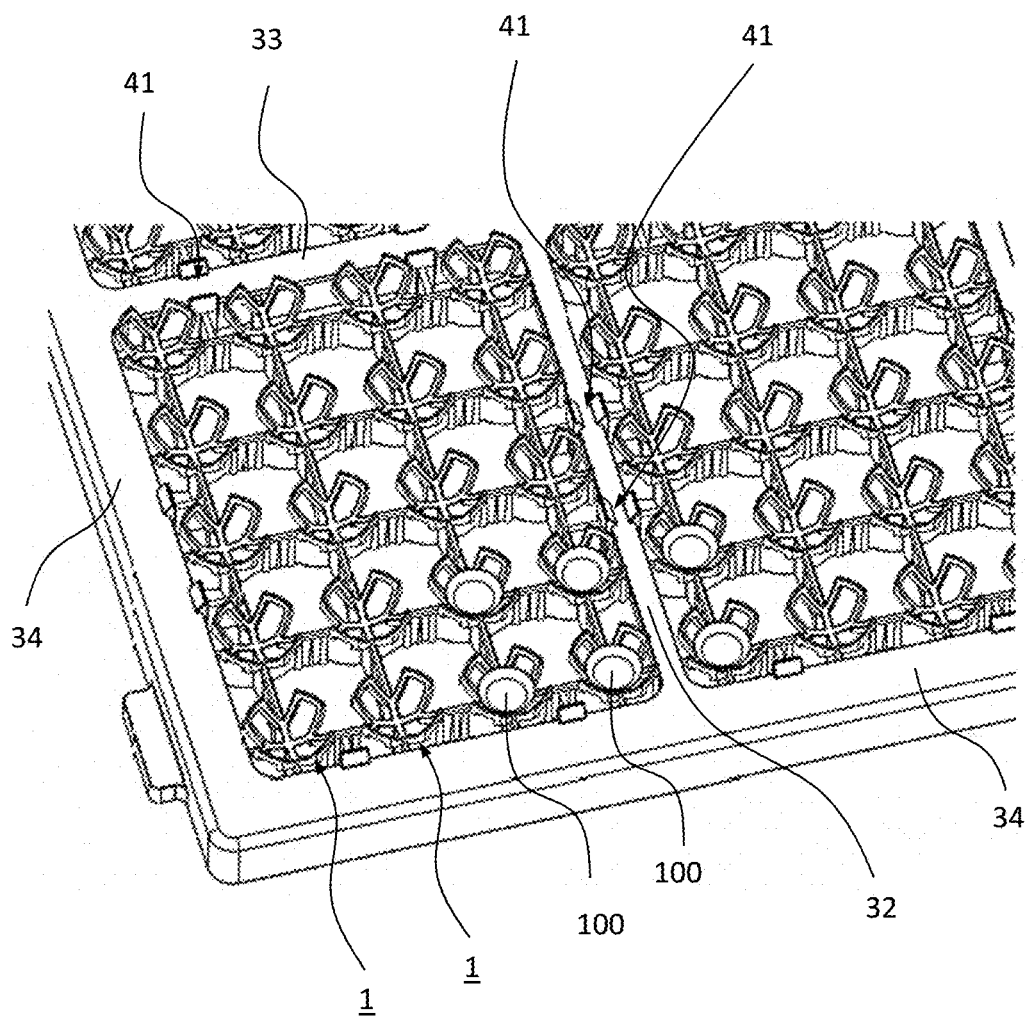
FIG. 4 shows a perspective view of a detail of the carrier tray shown in FIG. 3.

To allow for simultaneously processing a high number of contact lenses in a treatment bath, a plurality of carrier arrays 40 each comprising for example twenty carrier elements 1 in a 4×5 matrix configuration (as shown in FIG. 1) may be mounted to a frame 31 to form a stackable carrier tray 30. FIG. 3 and FIG. 4 illustrate an embodiment of such carrier tray 30. In the embodiment shown, the carrier tray 30 comprises eight carrier arrays 40 mounted to the frame 31 in a 2×4 matrix configuration. As can be seen in FIG. 1 already, adjacent carrier elements 1 within each carrier array 40 are connected with each other via adjacent retainer arms 21, i.e. the retainer arms 21 form connection bridges between the carrier elements 1. Even more, all carrier elements 1 within one carrier array 40 are formed integrally with each other in a single piece. Each carrier array 40 is made from a plastic material, and is preferably manufactured through injection molding, so that the carrier arrays are simple, robust and inexpensive to manufacture. The distance between adjacent carrier elements 1 within one tray unit 40 is small so as to achieve a high packing density, while at the same time allowing for a good flow of treatment liquid through the cavity and over the contact lens.

As mentioned already, the eight carrier arrays 40 are arranged in a 2×4 matrix configuration to form the carrier tray 30. To achieve this, the carrier tray 30 comprises a lattice-like frame 31 including a circumferential frame element 34 as well as one longitudinal frame beam 33 and three transverse frame beams 32. The lattice-like frame 31 comprises eight compartments arranged in a 2×4 matrix configuration, each for receiving a said carrier array 40. Each carrier tray 40 comprises two flexible snap-in hooks 41 arranged along each transverse and along each longitudinal side, and these snap-in hooks 41 are configured to engage with the longitudinal frame beam 33 and the transverse frame beams 32 of the frame 31 of the carrier tray 30, respectively, so as to arrange the carrier arrays 40 in the compartments and to securely (but releasably) attach them to the frame 31. The support frame 31 may also made from a plastic material, and in particular is also manufacture through injection molding.

Figure 5:
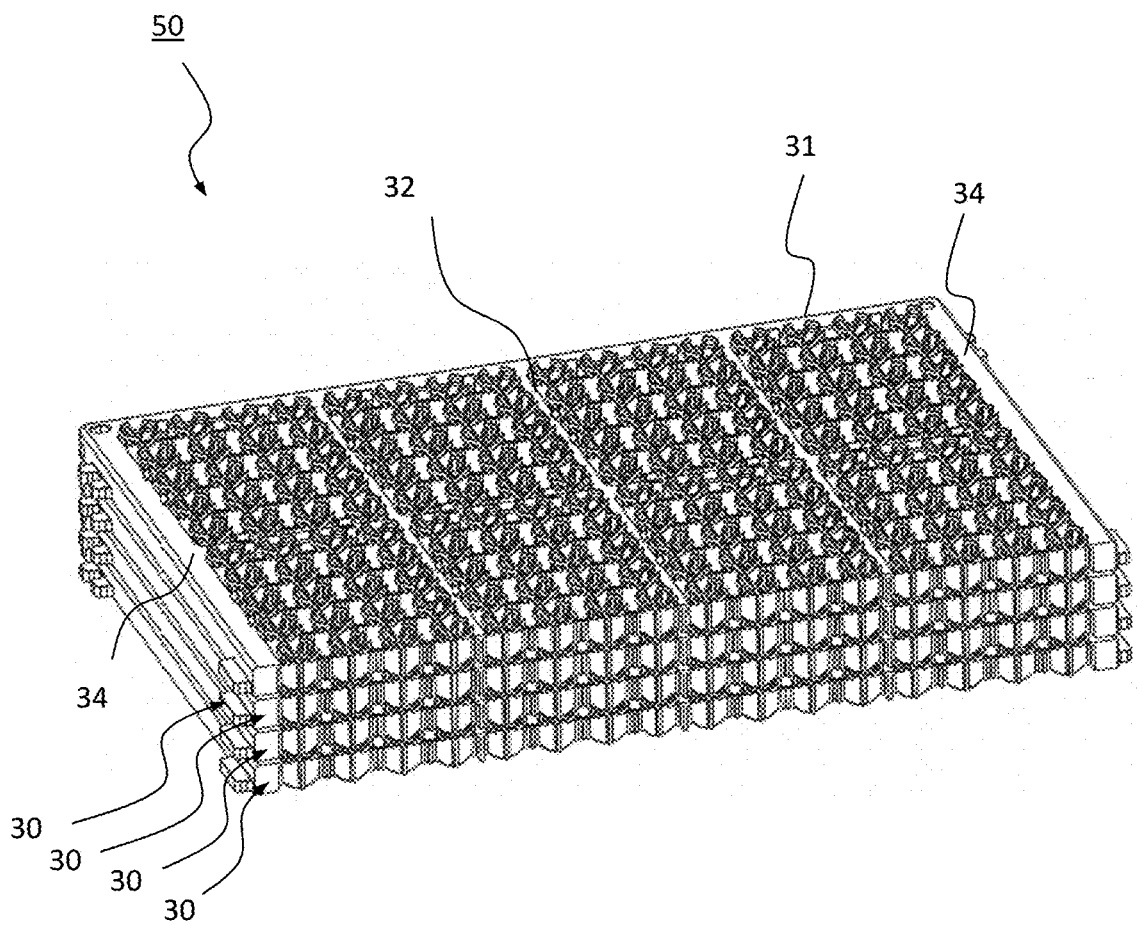
FIG. 5 shows a cross-sectional perspective view of an embodiment of a carrier stack system according to the invention, comprising three carrier trays as shown in FIG. 3 which are arranged one above the other to form a stack.
Figure 6:
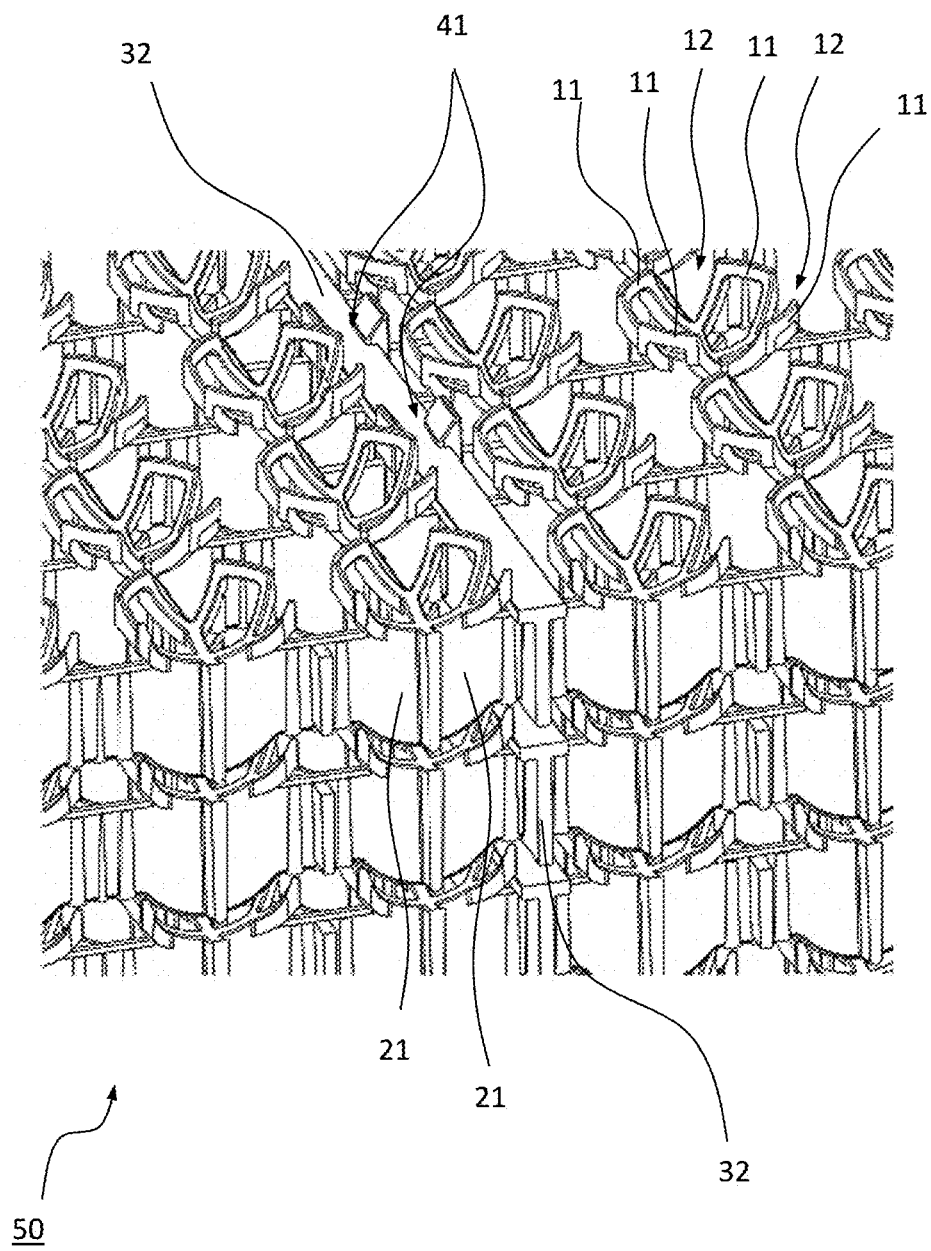
FIG. 6 shows a detail of the carrier stack system according to FIG. 5.

The frame 31 facilitates the stacking of a plurality of carrier trays 30 to form a carrier stack system 50. FIG. 5 and FIG. 6 show an embodiment of such carrier stack system 50 comprising, by way of example, four carrier trays 30 according to FIG. 3 and FIG. 4 which are stacked one above the other. However, any desired number of carrier trays 30 may be stacked one above the other. Such carrier stack system further increases the packing density. The distance between two carrier arrays 40 of two adjacently arranged carrier trays 30 of the stack defines the distance between the lens-contacting surface of the retainer arms 21 of the upper carrier tray 30 of the two adjacently arranged carrier trays and the opposing lens-contacting surface of the basket walls of the baskets 10 of the lower carrier tray 30 of the two adjacently arranged carrier trays 30. In the embodiment, this distance is essentially given by the height of the circumferential frame elements 34 which are arranged in direct contact one above the other. Accordingly, the baskets 10 and the corresponding retainers 20 forming the individual carriers are not in direct physical contact with each other.

In preparation of a bath treatment, a first carrier tray 30 may be loaded with contact lenses by placing contact lenses in the baskets 10 on the upper side of the first carrier tray 30. Next, a second carrier tray 30 is arranged on top of the first carrier tray 30 such that the retainers 20 arranged on the lower side of the second carrier tray 30 and the baskets 10 arranged on the upper side of the first carrier tray together form individual carriers securely holding the contact lenses. Thus, all baskets 10 of the first carrier tray 30 are simultaneously covered with respective retainers 20 in a single step. At the same time, the next array of baskets 10 to be loaded with contact lenses 100 is provided, as the second carrier tray 30 on its upper side comprises an array of baskets 10.

The invention has been described with reference to the embodiments shown in FIG. 1 to FIG. 6. However, for the skilled person it is evident that many changes and modifications can be made without departing from the general teaching underlying the invention. Therefore, the scope of protection is not intended to be limited to the embodiments described but rather is defined by the appended claims.

The invention claimed is:

1. Carrier for carrying an ophthalmic lens, in particular a contact lens such as a soft contact lens, during its treatment in a bath, the carrier comprising:
 a basket (10) comprising a basket wall defining a concave cavity for accommodating an ophthalmic lens (100), the basket (10) further comprising at least three recesses (12), said recesses (12) open toward a cavity defined by the basket wall and arranged in the basket wall at different locations along the circumference of the basket (10); and
 a retainer (20) comprising at least three retainer arms (21) arranged in a star-shaped configuration corresponding to the arrangement of the recesses (12) along the circumference of the basket (10), wherein in an assembled state each retainer arm (21) of the retainer (20) engages with a corresponding one of the recesses (12) in the basket wall of the basket (10) to retain the ophthalmic lens (100) in the cavity;

wherein the basket wall comprises at least three circumferentially arranged basket wall segments (11) defining the concave cavity, wherein between adjacently arranged basket wall segments (11) of the at least three circumferentially arranged basket wall segments (11) one of the said recesses (12) is arranged, respectively, wherein each basket wall segment (11) of the at least three basket wall segments comprises a U-shaped or C-shaped frame (13, 14).

2. Carrier according to claim 1, wherein the recesses (12) are continuous recesses extending through the basket wall.

3. Carrier according to claim 2, wherein the retainer arms (21) extend radially outwards through the continuous recesses (12) in the basket wall.

4. Carrier according to claim 1, wherein the recesses (12) are arranged to extend downwards from an upper rim of the basket wall.

5. Carrier according to claim 1, wherein an open area percentage of the basket wall is at least 30%.

6. Carrier according to claim 1, wherein each of the retainer arms (21) comprises a fin or a blade or a bar.

7. Carrier according to claim 1, wherein the retainer arms (21) radially merge in a common central hub (22) of the retainer arms.

8. Carrier according to claim 1, wherein the basket wall and each of the retainer arms (21) comprise a lens-contacting surface, and wherein the lens-contacting surface of the basket wall is larger than the sum of the lens-contacting surfaces of all retainer arms (21).

9. Carrier according to claim 8, wherein the lens-contacting surface of the respective retainer arm (21) is convex.

10. Carrier array (40) for forming a plurality of carriers according to claim 1, the carrier array (40) comprising a plurality of baskets (10) and a plurality of retainers (20)

each basket (10) comprising a basket wall defining a concave cavity for accommodating an ophthalmic lens (100), the basket (10) further comprising at least three recesses (12) arranged in the basket wall at different locations along the circumference of the basket (10); and each retainer (20) comprising at least three retainer arms (21) arranged in a star-shaped configuration corresponding to the arrangement of the recesses (12) along the circumference of the basket (10), wherein a said retainer (20) is integrally formed with each basket (10) and is arranged on a side of the basket (10) opposite to the basket wall defining the concave cavity, and wherein the baskets (10) and retainers (20) of the carrier array (40) are arranged in one or more rows or in a matrix configuration comprising rows and columns.

11. Carrier tray (30) comprising a frame (31) and one or more carrier arrays (40) according to claim 10 attached to the frame (31).

12. Carrier stack system (50) comprising a plurality of carrier trays (30) according to claim 11 arranged one above the other to form a stack, wherein with respect to two carrier trays (30) adjacently arranged in the stack the retainer arms (21) of the retainer (20) of an upper carrier tray of the two adjacently arranged carrier trays (30) engage with the recesses (12) in the basket wall of the basket (10) of the lower carrier tray of the two adjacently arranged carrier trays (30).

* * * * *